United States Patent [19]

Coetsier

[11] 4,423,633

[45] Jan. 3, 1984

[54] NOSE UNIT FOR A VEHICLE-WHEEL BALANCING MACHINE

[75] Inventor: Paul A. Coetsier, Chelles, France

[73] Assignee: Establissements M. Muller & Cie., Paris, France

[21] Appl. No.: 335,569

[22] Filed: Dec. 29, 1981

[30] Foreign Application Priority Data

Jan. 9, 1981 [FR] France .............................. 81 00270

[51] Int. Cl.³ .......................................... G01M 1/06
[52] U.S. Cl. ....................................... 73/487; 73/480
[58] Field of Search .................... 73/487, 480, 482; 157/21

[56] References Cited

U.S. PATENT DOCUMENTS 3,889,542 6/1975 Carrigan .......................... 73/487 X

FOREIGN PATENT DOCUMENTS 2701534 7/1978 Fed. Rep. of Germany ........ 73/487

Primary Examiner—James J. Gill
Attorney, Agent, or Firm—Young & Thompson

[57] ABSTRACT

The nose unit is formed by a hollow body of revolution having an annular flange and attached to a rotatable spindle. A series of crank-plates provided with studs for securing the rim of a vehicle wheel can be pivotally mounted on the annular flange. The crank-plates can then be positioned correctly by means of guiding grooves formed in a disk which is rotatably fitted within the annular flange. A cup acted upon by a spring is housed within the interior of the hollow body and cooperates with a cone for centering a wheel rim having a central bore. Vehicle wheels having rims of the central bore type or of the closed type can be balanced without any need for preliminary disassembly of the disk or of the cup, the centering cone being introduced either on the front side or on the rear side of the rim.

6 Claims, 10 Drawing Figures

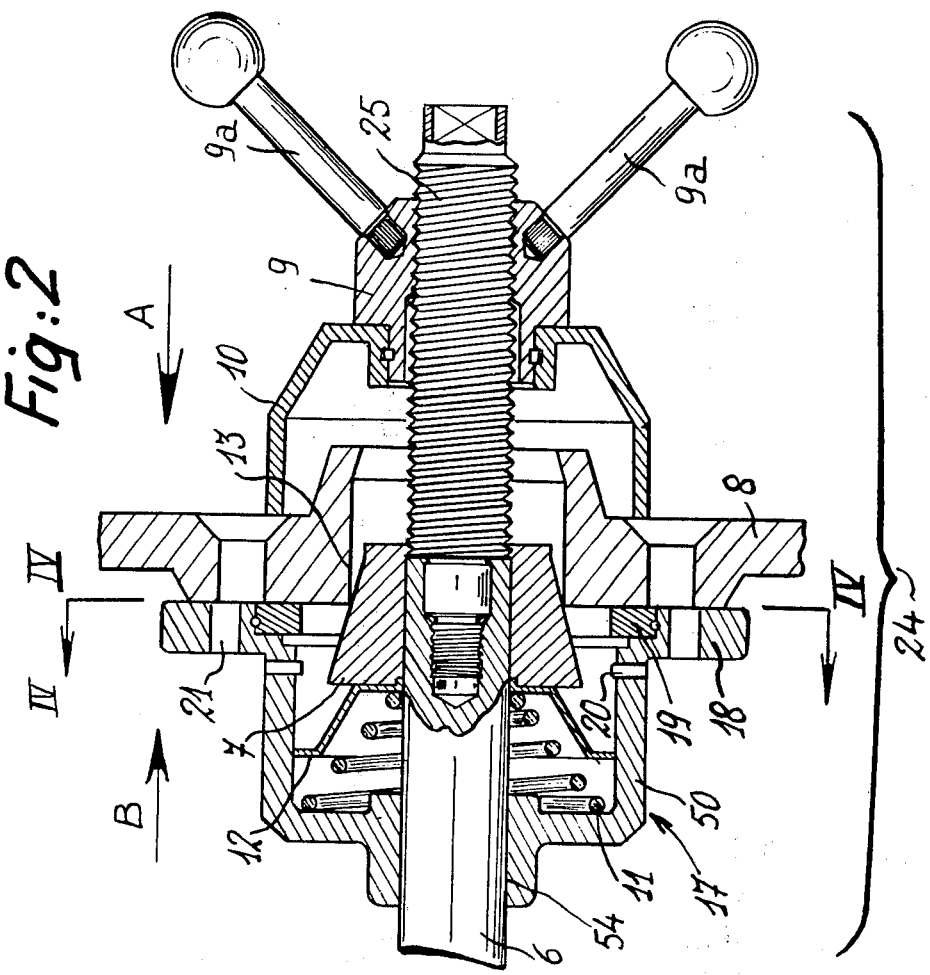
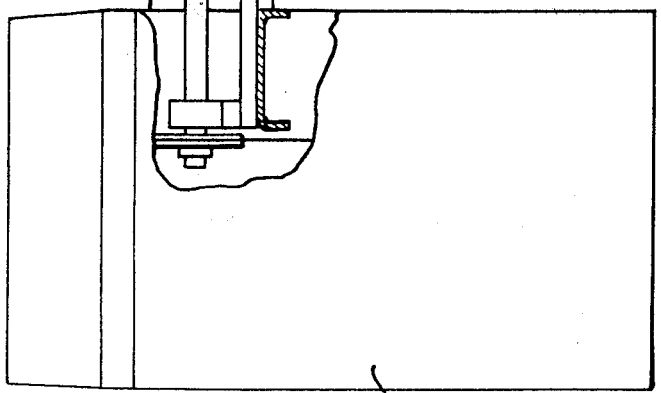

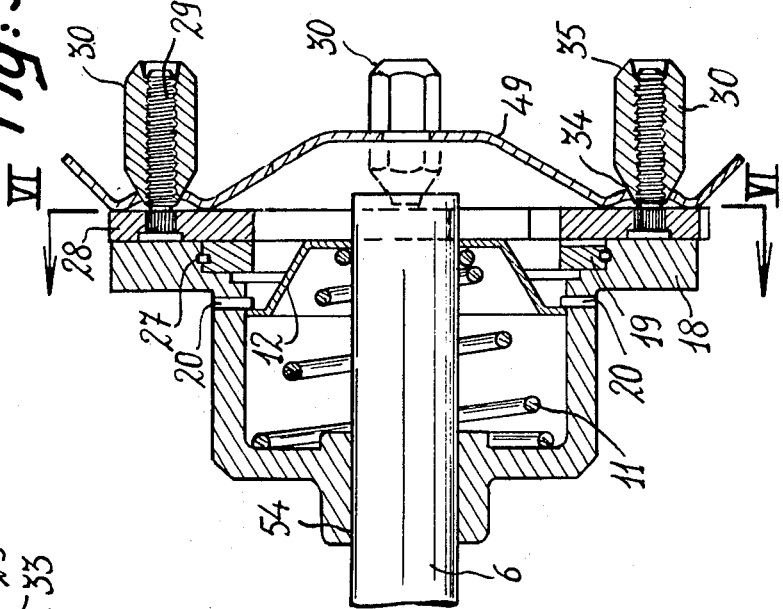
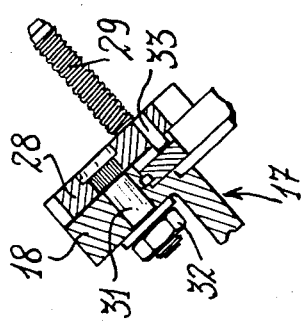
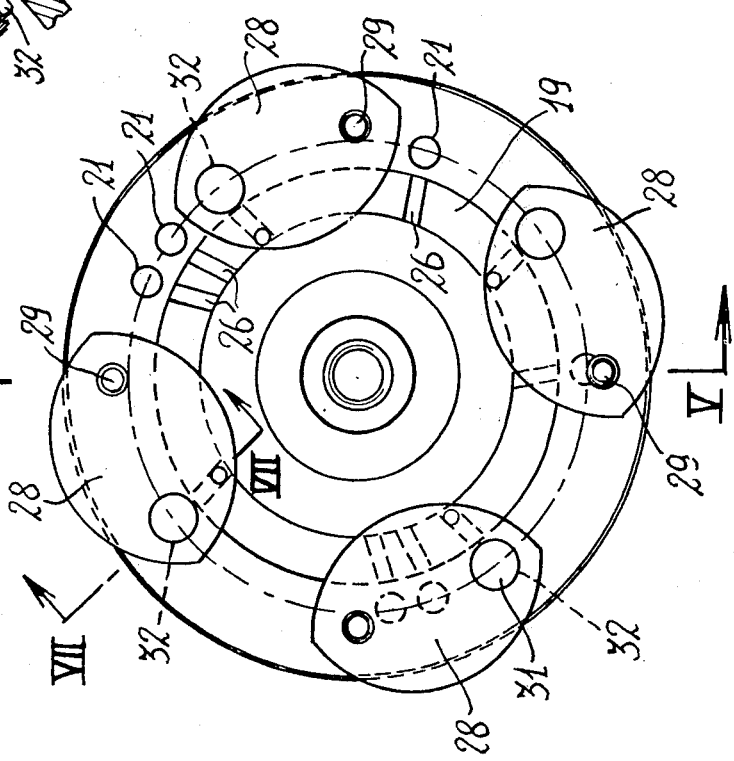

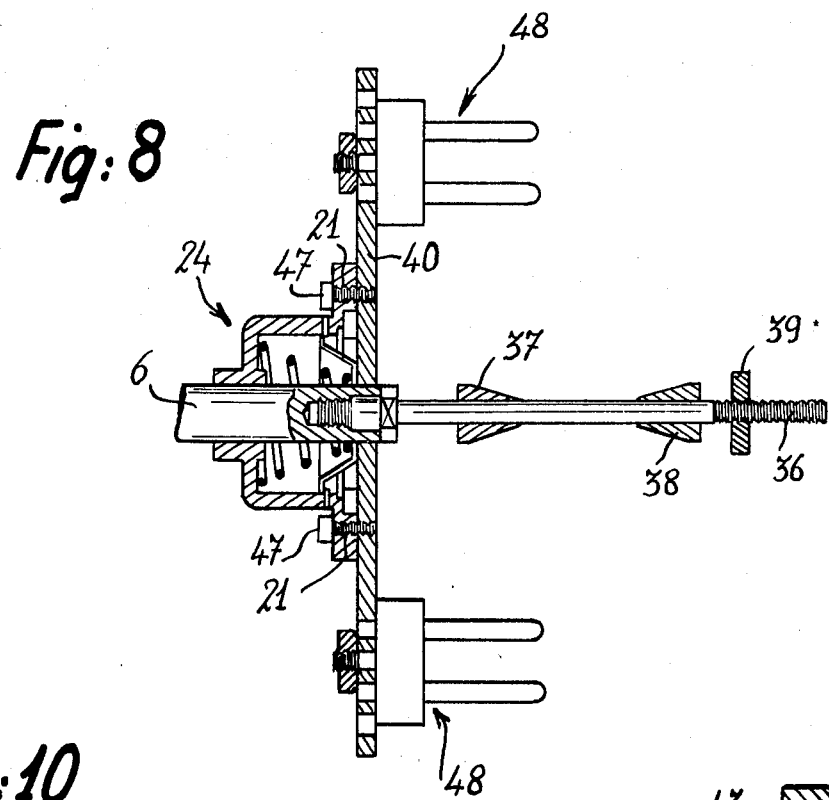
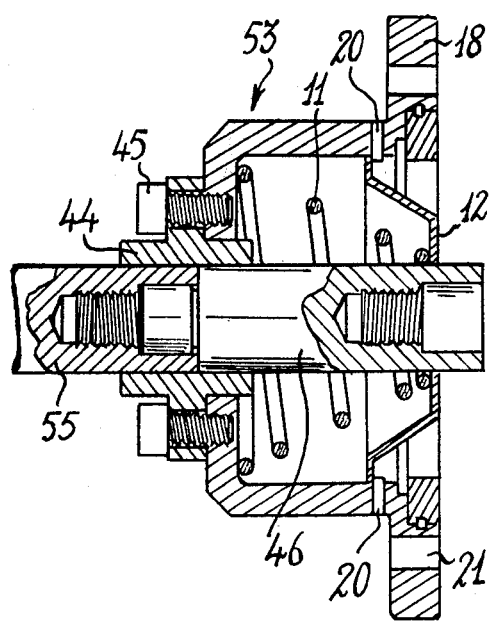
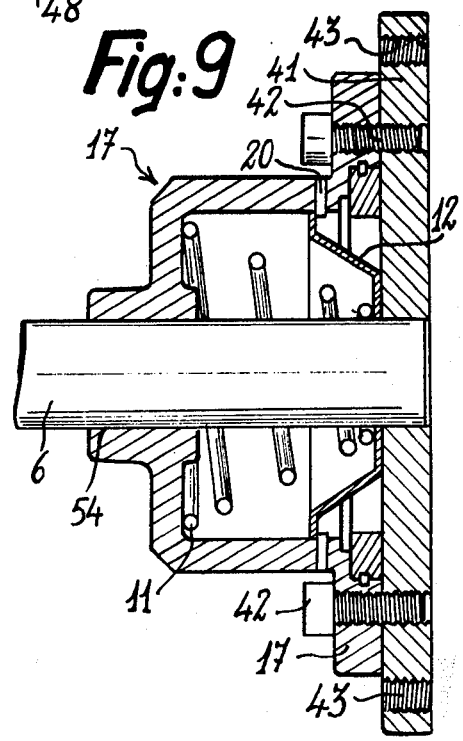

Jan. 3, 1984

NOSE UNIT FOR A VEHICLE-WHEEL BALANCING MACHINE

This invention relates to a nose unit for balancing vehicle wheels in which provision is made for a rotatable spindle and means for retaining a wheel to be balanced.

Wheel-balancing machines of known types are provided with a rotating spindle comprising a nose unit on which is mounted a system for supporting and securing the rim of the wheel to be balanced.

Said system for supporting and securing the wheel is arranged differently according to whether the rim of the wheel is of the open or closed type or depending in other words on whether the rim has a central bore or not.

In the event of a rim having a central bore, the vehicle wheel is usually centered on a special assembly known as a cone fitting or directly on the nose unit of the balancing machine by means of a cone mounted coaxially with the spindle and capable of displacement in sliding motion on this latter. Said cone is intended to engage within the bore of the rim either on the front side of this latter or on the rear side, that is, on the side corresponding to the interior of the nose unit of the balancing machine. In both cases, the same result is achieved: once the centering cone has been placed in position, the vehicle wheel is clamped on the nose unit of the balancing machine or on the suitable fitting by means of an external device consisting of a nut provided with an operating arm and mounted on a screw which is engaged coaxially within the spindle. Said device applies a bell-shaped thrust-piece or so-called bell-cap either against the rim in the case of centering by means of a cone engaged on the rear side of the rim or against the cone itself if this latter is engaged on the front side of said rim.

A third type of assembly is designed to be mounted on the nose unit of a balancing machine for vehicle wheels of the closed type which have to be centered by means of their mounting holes. The so-called universal assembly for closed rims is accordingly provided with an annular flange which is fixed coaxially with the spindle and in which is formed a series of holes for receiving the pivot-pins of corresponding crank-plates equal in number to the holes of the rim to be mounted or in other words three to six holes according to the type of wheel. Each crank-plate is fitted with a rim attachment stud which is tightly applied against the crank-plates by means of nuts screwed on the studs. As a complementary feature, a disk provided with grooves is arranged in coaxial relation to the spindle and dowel-pins rigidly fixed to the crank-plates are capable of displacement in sliding motion within said grooves. The crank-plates are thus endowed with a certain degree of freedom of rotational movement, thus making it possible to set the crank-plate mounting studs at the pitch corresponding to the holes of the rim.

It is thus necessary to provide a removable assembly which is adapted to the nose unit of a balancing machine and which is different in the case of each abovementioned type of vehicle wheel. This results in high production costs and entails the need for repeated handling operations each time it proves necessary to change both the type of wheel and the type of rim-mounting assembly.

The aim of the invention is to provide a universal nose unit which can be employed with equal ease for each type of vehicle wheel and rim-mounting assembly recalled in the foregoing without involving any need to remove a certain number of components beforehand.

In accordance with the invention, the nose unit comprises in combination means for balancing vehicle wheels which call for centering by means of a rear cone, means for balancing vehicle wheels which call for centering by means of a front cone, and means for balancing wheels having three, four, five and six holes and entailing the need for centering by means of their mounting holes.

In one embodiment of the invention, the means for retaining the vehicle wheel to be balanced comprise in combination:

(a) a hollow body of revolution attached coaxially to the spindle and having an external annular flange designed to serve as a support for the abutting application of the vehicle-wheel rim when said wheel is mounted by means of a centering cone in coaxial relation to said spindle;

(b) a cup housed within the hollow body in coaxial relation to the spindle and urged towards the central opening of the hollow body by a resilient member applied against the end-wall of said hollow body, said cup being adapted to exert a thrust on the cone when said cone is engaged within the rim on the rear side thereof, the direction of said thrust being opposite to the direction of the thrust exerted by an external device for clamping said rim against said hollow body;

(c) and a disk fitted for free rotational displacement within an annular recess in the front face of the annular flange and provided with a series of grooves which are inclined at a predetermined angle with respect to the radii of the disk and which are positioned in such a manner as to be located opposite to corresponding holes formed in the annular flange of the hollow body in respect of a predetermined angular position of said disk. By virtue of this arrangement, a series of crank-plate provided with studs for securing the vehicle-wheel rim can be pivotally mounted on the annular flange of said hollow body when the vehicle wheel to be balanced is to be mounted by means of the wheel-rim holes through which the crank-plate studs are accordingly passed, said studs being equal in number to the holes of said rim.

By means of this device, there can be mounted with equal ease on the nose unit of the balancing machine either open-type vehicle wheels centered by means of the cone which is introduced on the rear face of the wheel rim, open-type vehicle wheels centered by means of a cone introduced through the front face of the wheel rim, or closed-type vehicle wheels which are to be positioned on the nose unit by means of their mounting holes. In fact, the disk fitted within an annular recess in the annular flange of the hollow body does not project from the front face of this latter and its internal diameter is larger than the diameter of the largest cone employed. It is consequently unnecessary to remove the disk when it is desired to position wheels of the central bore type on the nose unit of the balancing machine.

Similarly, when mounting an open-type wheel and centering by means of the cone introduced on the rear side of the wheel, the cone is so dimensioned as to be capable of passing into the interior of the hollow body, is applied against the cup and causes this latter to withdraw towards the end-wall of the hollow body in opposition to the force exerted by its resilient restoring member. In this case, the bell-cap or thrust-piece of the external clamping device is applied against the wheel rim.

When mounting a vehicle wheel which has a central bore and must be centered from the front side, the centering cone is introduced through the front face of the wheel rim within the bore of said rim; the bell-cap is applied against the cone whilst the cup is acted upon by its resilient restoring member and brought level with the vertical plane in which the front faces of the disk and of the annular flange are located.

When mounting a wheel of the closed type by means of the system of pivoting crank-plates, the cup which is thrust forward by its restoring spring is again brought level with the aforementioned vertical plane and does not interfere with the rim-mounting operation in any way.

By means of the invention, different arrangements which had heretofore required separate and distinct assemblies, each of which had to be mounted in turn on the spindle of the balancing machine, are now advantageously combined in a single device which can be used with equal ease for each type of vehicle wheel and assembly involved. This universal nose unit therefore permits a substantial saving from the point of view of production cost while dispensing with the need for time-consuming and tedious handling operations.

Other features of the invention will be more apparent upon consideration of the following description, reference being made to the accompanying drawings which illustrate a number of embodiments of the wheel-balancing nose according to the invention, and in which:

FIG. 1 is a cutaway view in elevation of a vehicle-wheel balancing machine provided with a nose unit according to the invention;

FIG. 2 is an axial sectional view taken along line II—II of FIG. 4 and showing a first embodiment of the wheel-balancing nose unit according to the invention, the nose unit being employed when mounting an open-type vehicle wheel in which the centering cone is introduced from the rear side;

FIG. 5 is a half-elevation view taken in halfsection along line V—V of FIG. 6 and showing the use of the nose unit for balancing a wheel of the closed type which has been fixed in position by means of its mounting holes;

FIG. 6 is a view in elevation taken along line VI—VI of FIG. 5;

FIG. 7 is a fragmentary part-sectional view taken along line VII—VII of FIG. 6;

FIG. 8 is a half-elevation view in halfsection showing one embodiment in which the nose unit according to the invention is used for balancing motorcycle wheels;

FIG. 9 is a half-elevation view in halfsection showing another embodiment in which the balancing-machine nose unit according to the invention is used for balancing special wheels such as the wheels of heavy trucks or commercial vehicles;

FIG. 10 is an axial sectional view in partial elevation showing an alternative embodiment of the balancing-machine nose unit, the body of which is adapted to be fixed on another balancing-machine nose unit.

Figure 3:
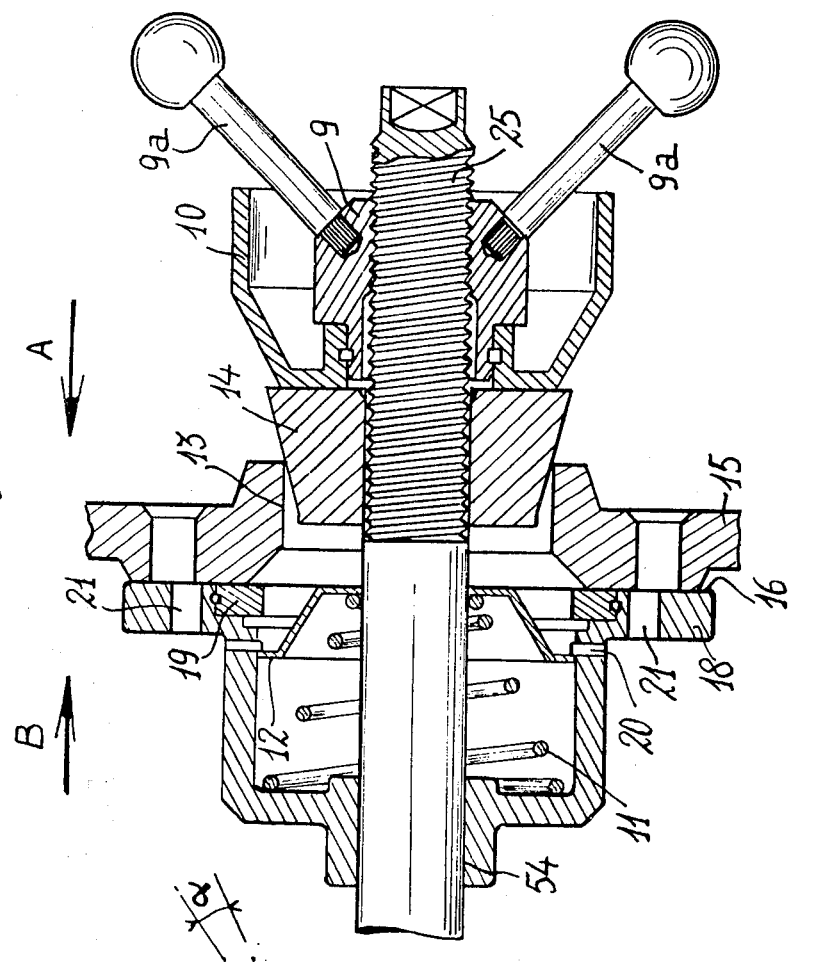
FIG. 3 is a view which is similar to FIG. 2 and shows the assembly of an open-type wheel centered by means of a cone introduced from the front side of the wheel.

There is shown in FIG. 1 a balancing machine 1 provided with bearings 2 in which is mounted a spindle 6. A nose unit 24 is mounted on the end of said spindle 6 and is intended to receive a vehicle wheel (not shown in the drawings) in order to carry out a wheel-balancing operation.

A first embodiment of the nose unit according to the invention for a wheel-balancing machine will now be described with reference to FIGS. 2 to 7.

Figure 4:
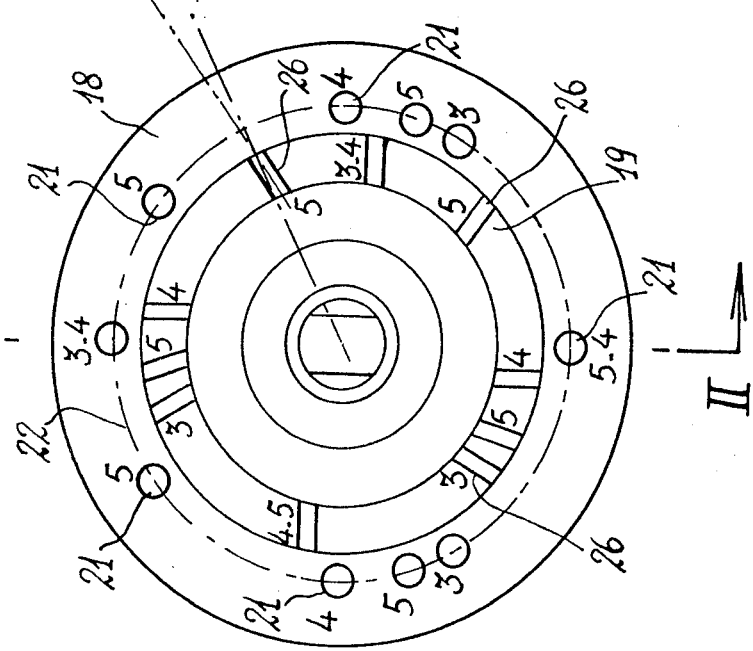
FIG. 4 is a view in front elevation taken along line IV—IV of FIG. 2.

The nose unit illustrated in FIGS. 2 to 7 is constructed by means of a combination of the following elements:

(a) a hollow body of revolution designated by the general reference 17 and mounted coaxially with the shaft of the spindle 6; said hollow body has an external annular flange 18 against which the wheel rim 8 is abuttingly applied when this latter is mounted with a centering cone in coaxial relation to the spingle 6 as will hereinafter be explained in detail;

(b) a cup 12 pierced by a central opening corresponding to the diameter of the shaft 6 and housed within the interior of the cylindrical portion 50 of the hollow body 17; said cup 12 is urged towards the central opening of the hollow body 17 by a resilient member 11 which is applied against the end wall of the cylindrical portion 50;

(c) and a disk 19 which is rotatably fitted within an annular recess formed in the front face of the annular flange 18; a series of grooves 26 are formed in the disk 19 and inclined at a predetermined angle α (as shown in FIG. 4) with respect to the radii of said disk 19. Said grooves 26 are adapted to cooperate with corresponding holes 21 formed in the front face of the annular flange 18 in order to permit balancing of wheels of the closed-rim type.

The cylindrical portion 50 of the hollow body 17 is mounted on the spindle 6 by means of any suitable coupling system 54 such as, for example, shrinking-on, bonding, keying, and so on.

In the example herein described, the resilient restoring member 11 is a helical spring wound coaxially around the spindle 6. Said spring tends to produce a translational displacement of the cup 12 in a direction parallel to the axis of the spindle 6 towards the opening of the hollow body 17. This translational displacement is limited so as to ensure that the external face of the cup 12, which has a frusto-conical configuration, is brought approximately level with the vertical plane containing the front face of the annular flange 18 when no force is applied in opposition to the thrust of the spring 11.

With this objective, it is proposed in accordance with a distinctive feature of this invention to provide stop means for limiting the travel of the cup 12. In the example herein described, said stop means consist of dowel-pins 20 force-fitted within radial holes formed in the hollow body 17 at a location corresponding approximately to the point at which the annular flange 18 is joined to the cylindrical portion 50. Under these conditions, the frusto-conical shape of the cup 12 is so determined that the external face of this latter in fact comes into position approximately in the vertical plane containing the front face of the annular flange 18 when the spring 11 is not subjected to any oppositely-acting force (as shown in FIG. 3), the annular base of the cup 12 being in that case abuttingly applied against the dowel-pins 20.

The holes 21 pierced in the annular flange 18 are placed on the same circumference 22. Said holes have on the one hand a first common apex 3–4 for mounting rims having three, four and six holes and, on the other hand, a second common apex 4–5 for mounting rims having four and five holes. Thus ten holes 21 are judiciously arranged on the circumference 22 at predetermined angular distances in order to permit the attachment of closed rims on the annular flange 18, said rims being provided with any number of mounting holes between three and six holes.

The grooves 26 formed in the disk 19 are equal in number to the holes 21 and positioned in such a manner as to be located opposite to the corresponding holes 21 in respect of a predetermined angular position of the disk 19. There thus exists a common groove 26 which cooperates for mounting rims having three, four and six holes as well as a second common groove 26 which cooperates for mounting rims having four and five holes.

The disk 19 is freely rotatable but secured against axial displacement by means of a retainer-ring 27 fitted within corresponding annular grooves of the annular flange 18 and of the disk 19.

In accordance with a further arrangement provided for balancing wheels of the closed-rim type which have to be secured to the hollow body 17 by means of their mounting holes, the nose unit contemplated by the invention comprises a set of crank-plates 28 equal in number to the holes of the rim 49 (as shown in FIGS. 5 and 6), four crank-plates 28 having thus been shown in FIG. 6. In practice, provision can be made for a maximum number of five crank-plates.

Each crank-plate 28 is provided with a bolt 31 which can be inserted in a hole 21 and permits pivotal displacement of the crank-plate 28 on the annular flange 18, the bolt 31 being locked in position on the annular flange 18 by means of a nut 32 (as shown in FIG. 7). Each crank-plate 28 is also provided with a stud 29 adapted to pass through a hole of the rim 49 in order to secure this latter to the hollow body 17 after a nut 30 has been tightened on said stud 29 as shown in FIG. 5.

Finally, each crank-plate 28 is fitted with a dowel-pin 33 which projects on the side nearest the disk 19 in order to be capable of sliding within a corresponding groove 26 and thus guiding the crank-plate 28 in rotational motion (as shown in FIG. 6). This arrangement makes it possible in a manner known per se to obtain concentric motion of the axes of the studs 29 by simultaneous pivotal displacement of the crank-plates 28 about their bolts 31.

The mode of utilization of the balancing-machine nose unit described in the foregoing will now be considered in the different cases mentioned earlier, that is to say in the operations which consist in balancing successively an open-rim wheel to be centered by introducing the cone 7 on the rear side of the wheel, an open-rim wheel to be centered by introduction of the cone on the front face of the wheel, then a closed-rim wheel to be secured to the nose unit by means of its mounting holes. There will then be described alternative forms of construction of the nose unit according to the invention.

1—Balancing of an open-rim wheel with centering from the rear (FIG. 2).

The user mounts the screw 25 within the spindle shaft 6 and places a cone 7 of suitable size in relation to the diameter of the rear bore 13 for centering the rim 8 of the vehicle wheel. After having placed the rim 8 in position on the cone 7, the operator screws-down the nut 9 having an arm 9a and fitted with a bell-cap 10 or bell-shaped thrust-piece in order to center the rim 8 on the cone 7. Centering is obtained by means of the combination on the one hand of the thrust load applied by the bell-cap 10 on the wheel rim 8 in the direction of the arrow A and, on the other hand, of the retaining effort exerted by the spring 11 as this latter is applied against the cup 12 which in turn thrusts the cone 7 in the direction of the arrow B.

This mode of centering of the wheel rim 8 is adopted when the bore 13 calls for centering on the rear side of the rim.

2—Use of the nose for an open-rim wheel with centering by means of a cone introduced in the front face (FIG. 3).

The user mounts the screw 25 within the spindle 6 and chooses a centering cone 14 of suitable size in relations to the diameter of the bore 13 of the wheel rim 15.

The user places the assembly consisting of wheel 15 and cone 14 on the spindle 6 and screws-down the nut 9 with its operating arm 9a and suitably inverted bell-cap 10 in order to ensure that this latter exerts an axial thrust in the direction of the arrow A on the cone 14 and consequently on the wheel rim 15. When the rim 15 finally comes into abutting contact with the front face of the annular flange 18, a force is applied to the rim 15 in the direction of the arrow B. The combination of the opposing forces applied to the rim 15 in the directions A and B permits centering of said rim on its front bore 13. It should be pointed out that the disk 19 provided for mounting wheels which are to be centered by means of their mounting holes does not need to be removed in the two cases of utilization described above, that is, for mounting wheels which are to be centered by means of their central bore.

3—Utilization of the nose unit in a universal assembly for mounting a closed-rim wheel to be centered by means of its mounting holes (FIGS. 4 to 6).

Depending on the number of mounting holes provided in the rim 49 of the wheel to be balanced, the operator places a corresponding number of crank-plates 28 on the annular flange 18 by inserting the crank-plate bolts 31 within the articulation holes 21 and by placing the crank-plate dowel-pins 33 within the guiding grooves 26. The operator determines the pitch of the mounting holes of the rim 49, sets the pitch of the crank-plates 28 in accordance with this value in a manner known per se and tightens the nuts 32 in order to perform moderate preclamping of the crank-plates 28 in this position.

The operator then places the wheel to be balanced on the studs 29 and centers the wheel by screwingdown the nuts 30 which are fitted with centering cones 34 and 35. The wheel is then centered by virtue of the displacement along circles which are concentric with the axis of each stud 29 of a crank-plate 28. The operator can then tighten the nuts 32 hard up.

A point to be noted is that the screw 25 can be uncoupled from the spindle shaft 6, thus making it possible to mount wheels of the closed-rim type (as shown in FIG. 5), that is, of the type in which the rim is closed at the center.

It is also worthy of note that, in the case of utilization of the nose unit according to the invention for balancing wheels which are to be centered by means of their mounting holes, the spring 11 and the cup 12 are abuttingly applied against the dowel-pin stops 20 and do not need to be removed.

The invention thus provides a universal nose unit involving a combination of means such that said nose unit can be employed with equal ease in all three types of vehicle wheels mentioned above without entailing any need to demount either the disk 19 or the spring 11 or the cup 12. This also dispenses with a large number of handling operations and thus achieves a substantial reduction in cost price of the wheel-balancing machine in comparison with known designs in which a special assembly is required for each type of wheel to be balanced.

The nose unit according to the invention is not limited to the cases of utilization described in the foregoing and may also be adapted to other applications which will now be described with reference to FIGS. 8 to 10.

4—Further possibilities of utilization of the nose unit according to the invention.

In the alternative embodiment illustrated in FIG. 8, the nose unit 24 is employed for balancing motorcycle wheels and is provided for this purpose with a mounting-plate 40 provided with members 48 for securing the motorcycle wheel (not shown in the drawings). The mounting-plate 40 is rigidly fixed to the annular flange 18 by means of screws 47 inserted in the holes 21 of said annular flange 18. A rod 36 is attached to the spindle 6 and adapted to carry two sliding cones 37, 38 which are capable of centering the wheel rim on the rod 36. A nut 39 which is coaxial with the rod 36 also cooperates for centering of the wheel.

In the alternative embodiment shown in FIG. 9, the nose unit 24 is more especially intended for balancing certain types of wheels such as those of heavy trucks, certain types of passenger vehicles, commercial vehicles and the like, or for any other rotating body to be balanced. In this embodiment, the nose unit 24 is fitted with a mounting-plate 41 centered on the spindle 6 and secured to the annular flange 18 by means of screws 42 which pass through the holes 21. Holes 43 corresponding to the pitch of the wheel to be balanced are pierced on the periphery of the mounting-plate 41. There is therefore mounted a special plate 41 in which the pitch of the holes 43 corresponds to the pitch of the mounting holes of each wheel to be balanced.

Finally, in the alternative embodiment of FIG. 10, the hollow body 53 is no longer coupled to the spindle 6 at the point 54 as in the previous cases. Thus the hollow body can be removably fixed on another nose unit 44 of any wheel-balancing machine by means of screws 45 which are introduced in corresponding holes pierced in said body 53. The spindle 6 is replaced by a stub-shaft 46 which is designed in a complementary manner to be fixed within the spindle shaft 55 of the nose unit 44.

In this case, the nose unit according to the invention is no longer permanently fixed on the spindle shaft but is adapted to be mounted on the nose unit of any type of balancing machine. Once this mounting operation has been completed, the assembly can be used for balancing different types of wheels as described in the foregoing.

The invention is not limited to the different embodiments hereinabove described and many different forms of construction may accordingly be contemplated.

From this it follows that the universal assembly described with reference to FIGS. 4 to 7 can be replaced by any device which serves to obtain concentric displacement of the studs 29. By way of example, such a device could consist of an assembly based on the use of meshing gears or of T-shaped grooves in which the wheel-mounting studs 29 are capable of engaging, said grooves being formed in the annular flange 18. The gear-drive system can be provided between the crank-plates 28 and the disk 19.

What is claimed is:

1. A vehicle-wheel-balancing-machine nose unit comprising means for balancing any of a plurality of different types of vehicle wheels, wherein said balancing means comprise in combination:

(a) a hollow body of revolution attached coaxially to a spindle and having an external annular flange designed to serve as a support for the abutting application of a vehicle-wheel rim when the wheel is mounted by means of a centering cone in coaxial relation to said spindle; a cup housed within the hollow body in coaxial relation to the spindle and urged towards the central opening of the hollow body by a resilient member applied against the end-wall of said hollow body, said cup being adapted to exert a thrust on the cone when said cone is engaged within the rim on the rear side thereof, the direction of said thrust being opposite to the direction of the thrust exerted by an external device for clamping said rim against said hollow body;

(c) and a disk fitted for free rotational displacement within an annular recess in the front face of the annular flange and provided with a series of grooves which are inclined at a predetermined angle with respect to the radii of the disk and which are positioned in such a manner as to be located opposite to corresponding holes formed in the annular flange of the hollow body in respect of a predetermined angular position of said disk, this arrangement being such that a series of crank-plates provided with studs for securing the vehcle-wheel rim can be pivotally mounted on said annular flange when the vehicle wheel to be balanced is to be mounted by means of the wheel-rim holes through which the crank-plate studs are accordingly passed, said studs being equal in number to the holes of said rim.

2. A balancing-machine nose unit according to claim 1, wherein means are provided for limiting the translational displacement of the cup under the thrust exerted by the resilient restoring member and consist for example of dowel-pins which are fitted radially within the interior of the hollow body and against which the periphery of the cup is abuttingly applied when the wheel to be balanced is centered by means of the cone which is engaged on the front side within the central bore of the wheel rim and supported by a screw introduced coaxially within the spindle.

3. A balancing-machine nose unit according to claim 1, wherein the freely rotatable disk is secured to the hollow body by means of a retainer-ring housed within corresponding annular grooves of said hollow body and said disk.

4. A balancing-machine nose unit according to claim 1 for balancing motorcycle wheels, wherein said nose unit comprises a mounting-plate provided with wheel attachment members, said mounting-plate being rigidly fixed to the annular flange of the hollow body by means of screws introduced within the holes of said annular flange, as well as a rod attached to the spindle and provided with sliding cones which are capable of centering the wheel rim on said rod.

5. A balancing-machine nose unit according to claim 1 and more particularly intended for balancing certain types of wheels such as the wheels of heavy trucks and commercial vehicles, wherein said nose unit is provided with a mounting-plate centered on the spindle and attached to the annular flange by means of screws passed through the holes of said flange, holes corresponding to the pitch of the holes of the wheel to be balanced being pierced at the periphery of said mounting-plate.

6. A balancing-machine nose unit according to claim 1, wherein the hollow body is stationarily fixed on the spindle or adaptable to another balancing-machine nose unit to which said hollow body can be rigidly fixed by screw-type means.

* * * * *